US006672168B2

(12) United States Patent  (10) Patent No.: US 6,672,168 B2
Higgins  (45) Date of Patent: Jan. 6, 2004

(54) MULTI-LEVEL MACHINE VIBRATION TESTER MARKER PEN

(75) Inventor: Ronald Alexander Higgins, Seymour (AU)

(73) Assignees: Andrew Braugh, Surrey Hill (AU); Michael Jeffery, Myrtleford (AU)

( * ) Notice: Subject to any disclaimer, the term of this patent is extended or adjusted under 35 U.S.C. 154(b) by 0 days.

(21) Appl. No.: 10/005,721

(22) Filed: Nov. 8, 2001

(65) Prior Publication Data

US 2003/0056593 A1 Mar. 27, 2003

(30) Foreign Application Priority Data

Sep. 24, 2001 (AU) ............................................. 75596/01

(51) Int. Cl.[7] ............................................. G01H 11/08
(52) U.S. Cl. ........................................... 73/660; 73/661
(58) Field of Search ........................ 73/660, 661, 659, 73/593, 658; 340/683

(56) References Cited

U.S. PATENT DOCUMENTS

| 4,312,232 | A | | 1/1982 | Stoutenburg ................. 73/659 |
| 5,376,933 | A | | 12/1994 | Tupper et al. .............. 340/984 |
| 5,870,699 | A | | 2/1999 | Canada et al. .............. 702/190 |
| 5,992,237 | A | | 11/1999 | McCarty et al. .............. 73/659 |
| 6,078,874 | A | * | 6/2000 | Piety et al. ..................... 73/660 |
| 6,178,821 | B1 | | 1/2001 | Savkar et al. ................. 73/650 |
| 6,257,066 | B1 | * | 7/2001 | Chandler et al. ............. 73/660 |
| 6,499,349 | B1 | * | 12/2002 | Aronsson ..................... 73/659 |

FOREIGN PATENT DOCUMENTS

| AU | A-15359/83 | 12/1983 |
| AU | A-79440/87 | 4/1988 |
| AU | A-29555/89 | 8/1989 |
| WO | WO 86/00144 | 1/1986 |
| WO | WO 86/03842 | 7/1986 |
| WO | WO 88/10431 | 12/1988 |
| WO | WO 91/01111 | 2/1991 |
| WO | WO 91/13288 | 9/1991 |
| WO | WO 94/27125 | 11/1994 |
| WO | WO 97/22010 | 6/1997 |
| WO | WO 99/50630 | 10/1999 |
| WO | WO 99/60352 | 11/1999 |
| WO | WO 01/14889 | 3/2001 |

OTHER PUBLICATIONS

Forrest M. Minis III Engineer's Mini Notebook "Sensor Projects" 1996 pp. 14–15.
Colin Michell "Electronic Notebook No. 4" 1985 p. 61.
J. Chatwin "Projects for The Electric Guitar" 1995 pp. 9 to 13.
Graf Sheets "Encyclopedia of Electronic Circuits" vol. No. 7 1999 pp. 514 to 515.
Dick Smith Catalogue Item Semiconductors, Data Sheet Pack vol. 2 p. LM3915–3912.

* cited by examiner

Primary Examiner—John E. Chapman

(57) ABSTRACT

The small tester is hand held by the writing pen body (21) when testing vibration with a housing mounted vibration probe (15) mechanically driving a piezo element (12), acted on by weight (11). The piezo element (12) has electrical connection (13) through an electronic circuit to an electronic display (22) indicating predetermined levels of vibration amplitude. The multi-level LED display (22) consists of four different colored LED's where illumination of a specific colored LED indicates a specific predetermined level of vibration amplitude. The electronic display (22) changing illumination of specific LED's from the lowest indicated level of vibration to just reach the highest indicated level of vibration is a nominal 6 dB increase in vibration amplitude at predetermined frequencies. The electronic display (22) though not necessarily in engineering vibration units can be digitally corrected to engineering vibration units on a computer display using an electrical connection (26,27) and suitable software and interfacing device. Simple frequency analysis for determination of a possible dominant frequency can also be performed using an electrical connection (26,27) to a frequency reading digital multimeter (30). Permanent data can be written on the machine surface at the test location using the marker pen writing nib (25). A very low cost tester for day to day use by maintenance workers in a typical factory.

8 Claims, 4 Drawing Sheets

FIGURE 3A.
FIGURE 3B.
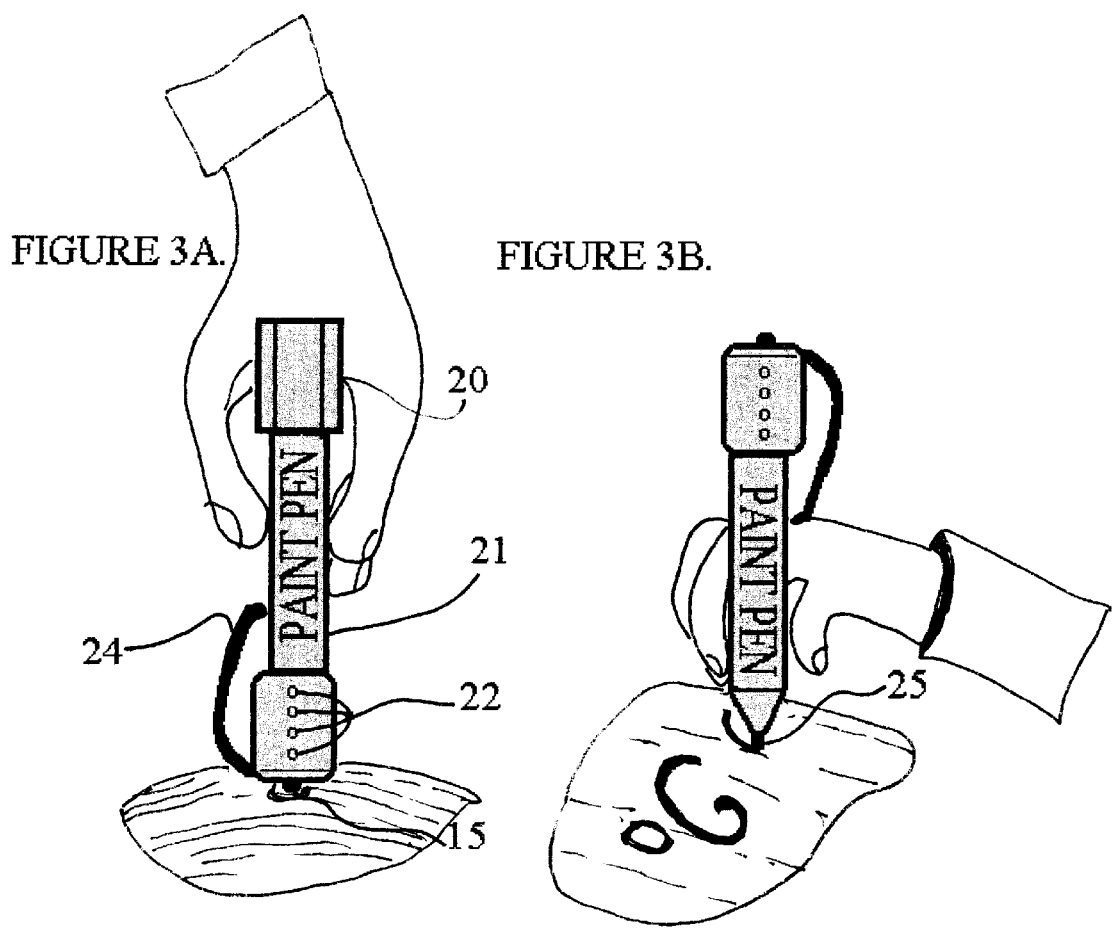
FIGURE 4A.
FIGURE 4B.
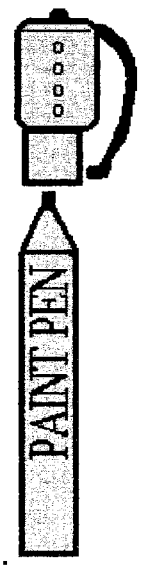
FIGURE 4C.

MULTI-LEVEL MACHINE VIBRATION TESTER MARKER PEN

CROSS-REFERENCE TO APPLICATION

This application is entitled to the benefit of Australian Documents Complete Specification 75596/01 filed Sep. 24, 2001 associated with Provisional Document PR 3389 filed Feb. 28, 2001.

BACKGROUND—FIELD OF INVENTION

This invention relates to a small low cost machine vibration tester with hand-held operation for vibration testing and data recording by typically factory maintenance workers repairing or operating low cost and non-critical machinery which has a speed of rotation speed of typically less than 12,000 revolutions per minute.

BACKGROUND—DESCRIPTION OF PRIOR ART

Much of the current machine vibration testing equipment is expensive, sophisticated, to scientific instrument standard, and are not commonly used by the majority of maintenance workers, except on expensive machinery. Maintenance workers who repair and often operate machines are often permanently working on site and often have the best time saving cost advantage to use machine vibration testing devices. Machine vibration testers assist in fault finding and repair work on machines.

The art of machine vibration monitoring in the 1930's was a variable length reed vibrometer which was a simple reed type spring, weight, holder, device. This device only has a few dollars of parts. For the vibrometer the amplitude of vibration of the spring when at resonance is an indication of machine vibration at the set frequency, hence acting as a distorted accelerometer with air damping of the moving spring, producing a variation in damping factor at different frequencies. The amplitude of the spring vibration is a measure of vibration but not necessarily in engineering units. While I believe air damping in the previous causes the distortion of amplitude at different frequencies, I don't wish to be bound by this.

This vibration tester is an update of the vibrometer using modern technology and the minimum of common electronic components.

Most current machine vibration monitoring devices use expensive calibrated transducers that converts the mechanical vibration into a voltage signal proportional to the mechanical vibration in engineering units of vibration (for example possibility mm/s RMS-velocity transducer, g-acceleration transducer, etc.). The calibrated transducer electrical signal output is then conditioned and analysed by very sophisticated and complex computer type circuits, especially for fast fourier transform (FFT) analysis, and then displayed in engineering units of vibration usually on a computer type screen. These expensive vibration transducers are mounted by various means such as epoxy, cyanoacrylate cement, threaded stud, permanent magnet, and are less commonly hand-held. Mounting the vibration transducer greatly increases the likelihood of exact repeatable results and reduces the risk of gross errors. The operating conditions of the machine subject to vibration testing can greatly effect vibration levels indicated. This applies especially to machines that can run at different load conditions.

SUMMARY

The vibration tester in the prototype embodiment or basic embodiment relates to a hand-held machine vibration tester and writing instrument comprising a small match box sized housing for an electronics circuit mounted on a liquid marking line writing pen body, so that the pen body can be held urging the housing mounted vibration probe against a machine surface to test machine vibration.

The housing exposes an electronic display indicating levels of vibration amplitude to four predetermined levels each designated by the illumination of a different coloured light emitting diode.

The vibration test result can be written on the machine surface as a permanent record of the vibration test and the exact test position on the machine surface.

The vibration tester has electrical connection to facilitate more detailed vibration tests using electrical connection to multimeter, computer, and other electrical equipment.

OBJECTS AND ADVANTAGES

Several objects and advantages of my vibration tester are:

Simple operation and design for on going use day after day on the factory floor. The only simpler device is the variable length vibrometer which is more time consuming to adjust and take amplitude readings. The vibrating reed is especially hard to observe in dark machinery spaces. In contrast the illumination of the LED's to indicate level of vibration amplitude facilitates use in dark machinery spaces.

Maintenance workers traditionally disassemble machines to find the cause of observed excess machine vibration. This often easily finds the cause for machine vibration problems including, loose rotating shafts in bearings, damaged rolling element bearings, bent shafts, loose components on rotating assemblies, plus others.

Sometimes visual inspection of disassembled parts will not verify imbalance of rotating assemblies, electrical faults in electrical alternating current motors, some V-belt drive problems, plus others as the cause of the excess vibration.

The vibration tester connected with a digital multimeter as described later can verify some of the listed causes of excess vibration that are not obvious from a visual inspection of disassembled parts.

The vibration tester is hand-held when taking vibration readings which is convenient for a quick look survey. Hand-held vibration readings can have errors and poor likelihood of exact repeatable results. The vibration tester is only intended to indicate significant increases in vibration from the previous vibration reading. This reduces the risk of false alarm type repairs.

Importantly the permanently written data on the machine surface also acts as a long term memory aid to maintenance workers. As even small factories can have hundreds of machines. Every maintenance worker at some time has stood looking at troublesome machine wondering if the machine is vibrating more than when it was brand new and reliable.

Excess machine vibration in some machines can cause repeated breakdowns and unreliability. If the cause of vibration is diagnosed and repaired a previous troublesome machine can become reliable again. In some machines a red LED illumination vibration level would indicate excess machine vibration.

The vibration tester if mass produced would be priced in the range of an engineering consumable product and could be replaced if broken. The current state of art "engineering unit(s)" calibrated transducers currently are too expensive to be considered a consumable product.

This vibration tester consists of the minimum hardware to give the operator a minimal visual indication of a possible significant change in machine vibration from a previously recorded vibration datum.

On the occasions, when more information is required, the vibration tester, has the potential to provide this. If the vibration tester is mass produced to a suitable level of conformity, suitable software would digitally correct the output signal to engineering units of vibrations. The software could perform a digital correction and fast fourier transform analysis in engineering units of vibration. This provides the option to use the vibration tester connected to a laptop computer, when more information is required to determine the reason for an increase in machine vibration within standard engineering vibration parameters perhaps using machinery manufacturers vibration data.

It is envisaged that the vibration tester singularly would be used for day to day testing in a typical factory. The vibration tester and laptop computer would only be used on odd occasions perhaps every couple of months. The laptop computer is less likely to be damaged from a rough factory environment with this pattern of use.

DRAWING FIGURES

In the drawings, closely related figures have the same number but different alphabetical suffixes.

FIG. 2B shows the response of display indication for a PRIOR ART flat response type transducer.

FIGS. 3A & 3B shows the operation of the vibration tester in two modes. FIG. 3A shows the tester being used to take a vibration reading. FIG. 3B shows the tester being used to write a vibration data reading.

FIGS. 4A to 4C show the tester in three possible embodiments.

Figure 5:
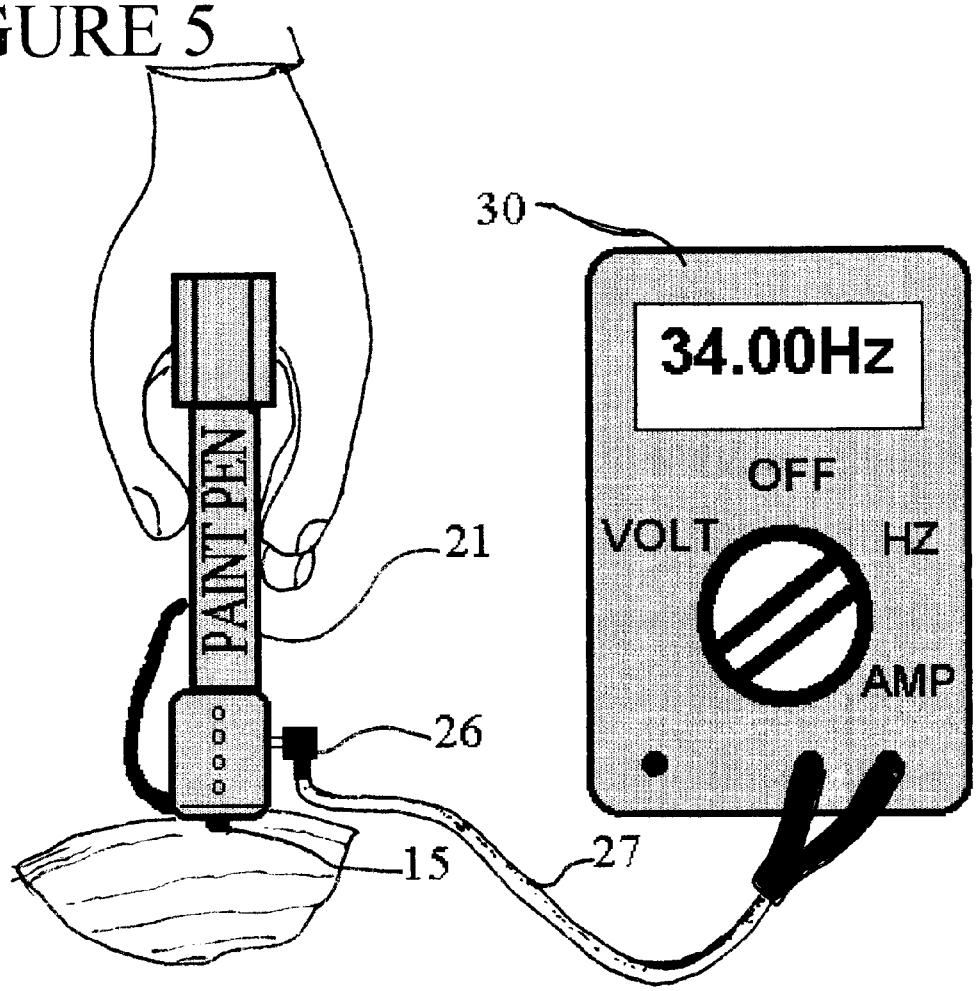

FIG. 5 show the vibration tester connected to a digital multimeter and the vibration tester being held to indicate a vibration level.

To assist with the understanding the vibration tester, reference will now be made to the accompanying drawings which show some embodiments of the vibration testers.

DESCRIPTION—FIGS. 1, 3, 4

Figure 1A:
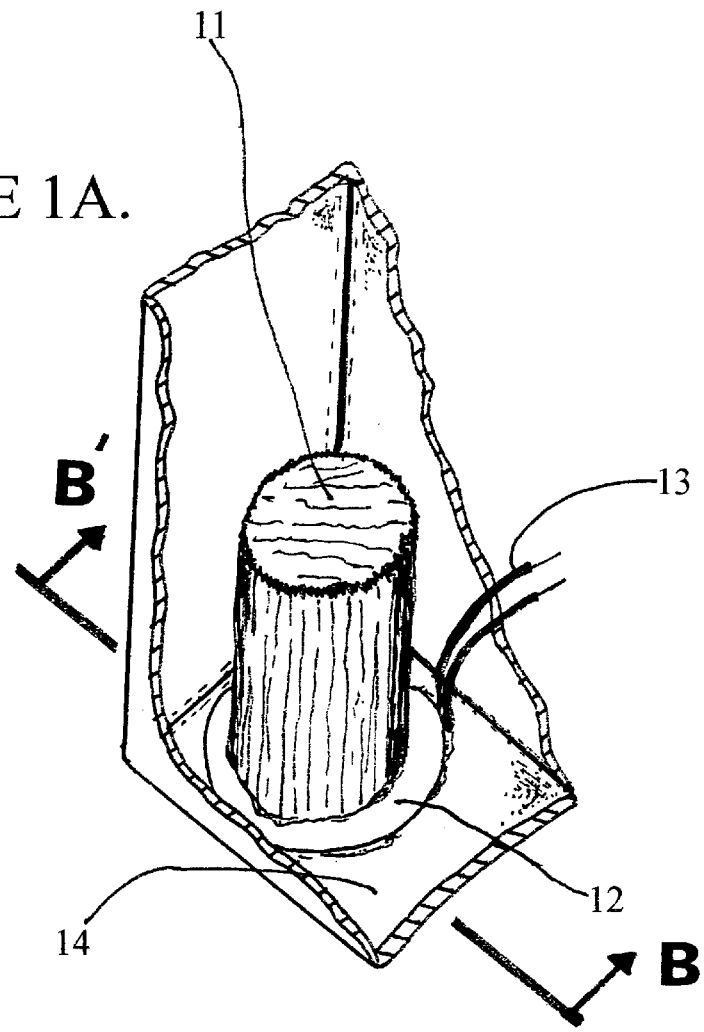
FIGS. 1A & 1B show the mechanical construction of the vibration transducer and vibration probe with the electronics housing.
Figure 1B:
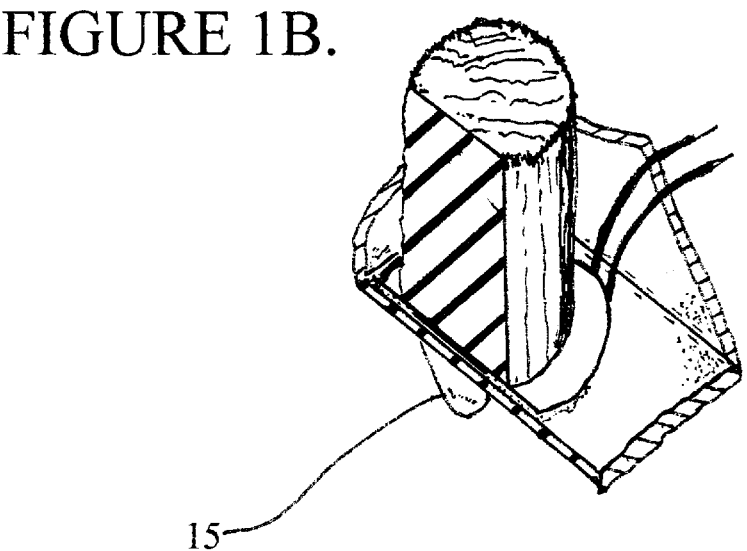

FIGS. 1A and 1B shows isometric view of the mechanical parts in the electronics housing of the vibration tester.

A proto-type embodiment was assembled from commonly available parts. Referring to FIG. 1A shows an isometric view of the mechanical parts in a cut-away housing section. The FIG. 1B shows a cross-section of FIG. 1A along the BB' plane. A proto-type embodiment transducer is manufactured by gluing components commonly available. The glue is two part mix epoxy resin. Some components are a piezo element 12 and a weight 11, a vibration probe 15 an electronic circuit. The base is a small plastic housing box wall section 14 glued to a piezo element 12 in the orientation piezoelectrical material side to the wall section, while the brass mounting plate side is glued to a 10 to 40 gram lead weight the proto-type embodiment used a 20 gm lead weight. At the outside adjacent position on the wall section a small knob of hard plastic, wood, or metal, is glued to it to act as a vibration probe 15. The vibration probe 15 has a dome shaped end. The two wires 13 from the piezo element 12 are connected to the electronic circuit. The proto-type embodiment transducer used a field effect transistor (FET) preamp electronic circuit to drive the display part of the electronic circuit.

The pen body is an integral part of the vibration tester during the act of taking vibration readings. The housing alone would be too small to hold firmly when taking vibration readings. With the housing rigidly attached to the pen the vibration probe is forced to move with a vibration movement related to the machine surface vibration.

The electrical output from the transducer is amplified by a pre-amplifier circuit to an output level that has the capability to drive a multiple voltage comparator circuit, driving a multiple LED voltage level display, also commonly called a "bargraph voltmeter".

The vibration tester has a vibration transducer or mechanical part that is an integral part of the electronics housing. The housing must have provision for shielding the electronic circuit from electromagnetic fields to limit spurious electrical signals not related to the mechanical vibration signal.

To assist with understanding some possible applications of the vibration tester, reference will now be made to the accompanying drawings, which show some possible applications of the vibration tester.

Two modes of use of the tester are:
in FIG. 3A in vibration indicating mode
in FIG. 3B in data writing mode.

FIG. 3A illustrates one example of a Vibration Tester being held to take a reading of the Vibration Level at a specific point on a section of machine surface, only cut-off section of machine surface drawn. The vibration probe 15 is pressed firmly against the machine surface and the reading is obtained by noting the colour(s) of the light(s) that are illuminated. The reading is designated as the highest voltage indicating colour illuminated. For example if green, yellow and orange displays are illuminated as a steady pattern of illumination then "O" or orange is the designated reading. In this case the writing nib of the pen is protected with the end cap 20. The pen is hand held to take readings with the hand grasping the main body 21. The main body 21 may be manufactured with product information printed upon the outside surface. FIG. 3 FIG. 4 and FIG. 5 shows a "PAINT PEN" logo printed on the outside surface of the paint/ink pen.

The pocket clip 24 is only used when the vibration tester is carried in the pocket of some clothing of a maintenance worker.

FIG. 3B illustrates one example of a Machine Vibration Multi-Level Tester Marker Pen being used to write the vibration and other related data on a machine surface (only part cut-off machine surface drawn for simplicity). The writing end cap is removed exposing the writing nib 25. The hand grasps the main body 21 and writes as in the FIG. 3B. An important function of the marker is to write an enclosed shape for example a circle, or star, or box to indicate the exact position of the vibration probe on the machine surface when taking readings. This is to ensure readings have greater likelihood of repeatable results all other criteria being equal. On some machine surfaces vastly different vibration readings can be obtained moving a vibration probe only a centimeter. The FIG. 3B illustrates a circle and "G" already written as a permanent data on the machine surface. The "G" would denote a "low" vibration reading of green LED illumination only.

It will be realized that the vibration tester of FIG. 3A is not the only embodiment of the vibration tester but may include many possible arrangements of which two further arrangements are shown. Some three (3) forms of mounting the electronics housing to the paint/pen pen body 21 embodiment are illustrated in FIG. 4A; FIG. 4B; FIG. 4C respectively. Note FIG. 4A & FIG. 4B drawn without cap 20 fitted. Referring to FIG. 4C the electronic housing has the facility to be used as a cap 20 for the writing nib 25 sealing the nib from the outside air.

ALTERNATIVE EMBODIMENTS

In an alternative embodiment the housing wall 14 is metal (conductive) and earthed to the electronics circuit-here enough epoxy resin must be used to ensure the solder to wire 13 connection to the non-earthed side of the piezo element, and also the piezoelectric material, does not short out the piezo element. In this design the metal plate much stronger than plastic of same thickness, raises the natural frequency of the transducer. This reduces the deflection of the piezoelectric material and the generated electrical signal amplitude output relative to the mechanical vibration amplitude. Metal housing wall embodiments of the vibration tester demonstrated natural frequencies of over 500 Hz in various experiments.

For a mass manufactured embodiment the vibration tester could have variations from prototype embodiment. The driver/display with all electronics, could be housed in a housing the size of a match-box, or smaller, made of plastic or metal. This would be easily achieved by using components purpose built. The mechanical part is comparable with the size of a piezoelectric stylus pick-up on a record player. The mass produced embodiment could use a permanently hardening adhesive other than epoxy resin. The mass produced embodiment could use a material other than lead as the weight. Further size reduction of housing can be achieved by standard surface mount technology or a custom designed electronic chip. The housing must have provision to contain a battery and on/off switch mounting.

Figure 2A:
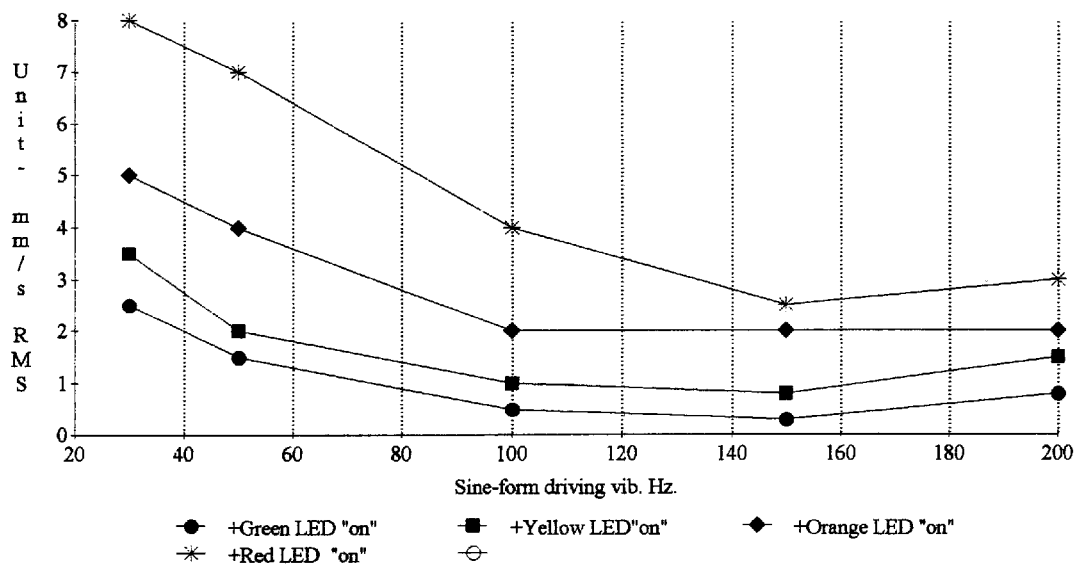
FIGS. 2A & 2B show the results of experiments relating to sinusoidal vibrations verses display indication for the vibration tester of a proto-type embodiment.

The mass produced embodiment would have variations from transducer characteristic graph as shown in FIG. 2A. Any mass produced embodiment of the vibration transducer of a common model or production run would have a manufactured conformity to produce a common transducer characteristic graph. The characteristic graph, for example, FIG. 2A can be altered by variations in mechanical components, in size and chemical composition, and method of assembly of components, and the design of the electronic circuit.

The piezo element used in the prototype embodiment is of the type found in piezo element speakers and as such are a very common electronic component made in various sizes and materials. These piezo elements tend to be flat round discs with the two conducting wires attached. In alternative embodiments different types of piezo elements have been implemented for example, a flat elongated rectangular section piezoelectric ceramic bimorph element, for example, part number 285784 from RS Components Pty Limited of Melbourne, Victoria Australia. The rectangular section is located centrally in a buttered joint of, for example epoxy resin, between the motion axis of the vibration probe and the weight. This bimorph element has no brass base plate and the alignment in the vibration tester is with the bending plane perpendicular to the axis of vibration developed by the vibration probe 15.

PRIOR ART

Figure 2B:
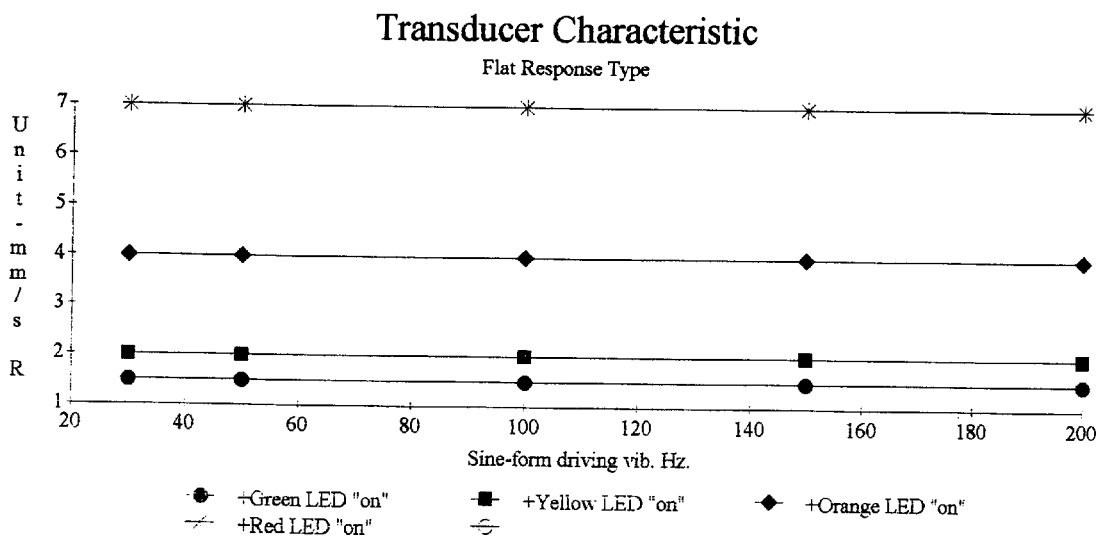

Typical prior art commercial machine vibration transducers are usually mechanically isolated from the electronics housing and display. These have the piezo crystal or ceramic in mechanical compression using a screw thread. The higher piezoelectric material compression and heavier construction provide greater mechanical stiffness increasing the engineering "k" factor. This design has a high natural frequency (typically 3000 Hz hand held with probe) and has flat response characteristics, inclusive of the range 30–200 Hz. Flat response characteristics would be described by an audio engineer as ideal. An example flat response transducer driving a multi-level LED display is graph FIG. 2B. These prior art vibration transducers are commonly mechanically isolated from any electronics housing incorporating an electronic display.

Generally these prior art machine vibration transducers are expensive costing several hundreds of dollars each. This large expense is the main reason most factory maintenance workers do not use the prior art transducers to assist with testing and repairing machines, relying instead on traditional methods.

Operation—FIGS. 1, 2, 3, 5

To assist in understanding how the vibration tester can function without always displaying vibration levels in engineering units the experimental data obtained from tests is shown in FIG. 2A as a graph for the prototype embodiment of the vibration tester.

The characteristic graph for the proto-type embodiment vibration transducer is illustrated in FIG. 2A. The characteristics graph showing the mm/sec RMS in velocity engineering units verses exciting sine wave frequency of vibrating shaker table is plotted. The FIG. 2A illustrates the frequency range 30 to 200 Hz. (turning speed range of numerous factory floor machines). The proto-type embodiment vibration transducer was constructed to drive a "bar-graph voltmeter" using comparator circuits that illuminated in order 4 LED's coloured first lowest voltage, green, yellow, orange, red the highest voltage reading.

In the frequency range illustrated in FIG. 2A the LEDs illumination increasing from green to red illumination with increasing amplitude of sine wave form vibration at each specific frequency illustrates a doubling (6 decibel) or greater in engineering units of the vibration amplitude.

The proto-type embodiment vibration tester has mechanical resonance at a number of frequencies the largest in amplitude was 240 Hz. This causes machine vibration of frequencies above 240 Hz to have indication of reduced amplitude vibration levels. The mechanical design of the proto-type vibration tester acts as a mechanical low pass filter to frequencies below 240 Hz. Alternative embodiments of the mechanical design can have different frequencies of resonance to the proto-type embodiment.

When viewed with the naked eye the LED electronic display blurs a rapidly changing vibration signal into the appearance of a steady display. The vibration signal is typically alternating current, often of a complex form. The four LED electronic display de-emphasises small but repeating changes in the amplitude of any input signal. The four LED display is superior to a real time digital voltage readout or analogue voltage indication which would be difficult to read if constantly changing.

The test using a proto-type embodiment of the vibration tester was required because most common machinery vibration standards, for example ISO Standard 2372-1974, relate to velocity engineering units of vibration. The proto-type embodiment vibration transducer was shown to operate in the frequency range and vibration amplitude suitable for trend testing many common machines.

The ISO Standard 2372 provides Standard Comparison in overall vibration for Class 11 Machines that are most numerous in many factories. Typically they are electric motors with 15 to 75 kW output generally medium machines without special foundations, rigidly mounted engines, or machines on special foundations—up to 300 kW.

The following list provides guidance of machine condition with operating frequencies of 10 to 200 Hz (600 to 12,000 RPM) as approximating to nearest 1 mm/s RMS

| Good | 0–1 mm/s RMS |
| Satisfactory | 1–3 mm/s RMS |
| Unsatisfactory | 3–7 mm/s RMS |
| Unacceptable | 7–+ mm/s RMS |

NB. mm/s RMS is a velocity engineering vibration unit of amplitude

Trend testing comparison this compares current vibration level with previous vibration level obtained for the same data point over a period of time (usually weeks to months prior).

The FIG. 2A in the 50–200 Hz range provides a similar range to ISO 2372 with different colour illuminations providing ranges of vibration levels in a similar pattern ie.

| Green illumination | 1–2 mm/s RMS |
| Yellow illumination | 1.5–4 mm/s RMS |
| Orange illumination | 3–4.5 mm/s RMS |
| Red Illumination | 5–+ mm/s RMS |

As mentioned before a green to red illumination is an indication of a vibration amplitude increase of 6 dB or greater. This 6 dB increase of vibration amplitude level over time typically (weeks/months/years) is considered "significant" in machine monitoring routines by the Canadian Navy (described in Machinery Vibration—Measurement and Analysis by Victor Wowk ISBN 0-07-071936-5).

Simple Frequency Analysis

Advances in electronics test equipment in the recent years provide massive cost reductions in purchase price of digital multimeters with frequency reading test function. The cost is now within the price range for many maintenance workers who regularly use a multimeter to diagnose electrical problems in machines. These frequency read-out digital multimeters can provide extra information often not previously available at low cost. The possible connection to a digital multimeter to provide information relating to a possible dominant frequency means the vibration tester can be used for simple frequency analysis at a low cost. The simple "frequency analysis" works only where one frequency is dominant with a much larger amplitude over all other frequencies, within the working ranges as per "characteristic graph". This is determined by noting the frequency reading of the digital multimeter over a minute or so. If the digital multimeter frequency reading is constant this may be the one frequency dominant over others. If the digital multimeter frequency reading is constantly changing over a wide range the vibration signal is of a complex form.

To assist in understanding the use of the vibration tester with a digital multimeter, reference will now be made to the accompanying drawing which show one example of this application.

FIG. 5 illustrates one possible method of connection using customised electrical test leads. Referring to FIG. 5. The vibration tester is held by the ink/paint body 21 with the vibration probe 15 firmly pressed against the machine surface. A digital multimeter 30 using an audio/phono mono plug 26 is connected by electrical leads 27 to digital multimeter sized banana plugs. The banana plugs are plugged into the digital multimeter sockets. The digital multimeter must be switched to frequency reading function and the frequency reading noted also any fluctuations in the reading.

Advanced Frequency Analysis

The digital multimeter can be replaced with an interface device connected to a laptop computer running FFT software. Suitable FFT software was twenty years ago "state of art" and very expensive is now available free over the internet.

CONCLUSION, RAMIFICATIONS, AND SCOPE

The vibration tester provides a low cost vibration tester, in the consumable product price range, to the factory floor maintenance worker. As the number of machines in factories increase with less time and money for maintenance operations this vibration tester fills a gap in the range of existing vibration monitoring equipment. The vibration tester aims to test low cost and non-critical machinery which has a speed of rotation speed of typically less than 12000 rpm.

The vibration tester will provide machine vibration data to indicate many common machine problems, not limited to, but including, imbalance, coupling misalignment, resonance, belts and pulley problems, faulty bearings, abnormal electrical motor vibrations.

It is important to note that for on going consistent monitoring with this vibration tester a model/production run with the same characteristic graph would have to used at each machine test location. The characteristic graph for each model/production run of this vibration tester would be sold with each device and listed with the specification listing. The computer software would require details specific to each model/production run to digitally correct the computer display to engineering vibration units, therefore machine vibration signatures can be compared with similar machines anywhere in the world.

The vibration tester as previously described could be manufactured without any electronic display. The machine vibration level indicated by connection to suitable electrical equipment.

An alternative embodiment in method of manufacture is the vibration probe 15 and the wall section of the housing 14 as one integral part.

Although the description above contain many specificities, these should not be construed as limiting the scope of the invention but merely providing illustrations of some of the embodiments of this invention. For example the possible future types of piezo elements of small size, could prove useful in future further size reduction of the electronics and housing.

Although the description above contains many specificities, these should not be construed as limiting the scope of the vibration tester but as merely providing illustrations of some of the preferred embodiments of this vibration tester. For example advances in electronics in future years could provide technology to effect the vibration tester so the electronics required are a tiny package the size of a small coin. The further development of pocket sized electronic devices calculators, organizers with facilities for FFT analysis and data storage facilities could supplement the use of the computer with the vibration tester.

Thus the scope of the invention should be determined by the appended claims and their equivalents, rather than by the examples given.

I claim:

1. A hand-held machine vibration tester comprising:
   (a) a housing about the size of a small match box to contain an electronic circuit;
   (b) a vibration probe mounted on the outside surface wall section of said housing;
   (c) a piezo element mounted to the adjacent, inside surface wall section of said housing with a permanent hardening adhesive to form a buttered joint between the inside housing wall and said piezo element;
   (d) a weight mounted on said piezo element, with a permanent hardening adhesive to form a buttered joint between said weight and said piezo element;
   (e) said electronic circuit for controllably electrically coupling the output from said piezo element, to drive an electronic display exposed via said housing;
   (f) an electrical connection sampling output from said electronic circuit, so that connection can be made to electrical equipment;
   (g) said electronic display for displaying levels of vibration relating to amplitudes and the corresponding frequencies of mechanical vibration exciting said piezo element;
   (h) a liquid marking line writing pen body attached rigidly to said housing, so as to not obstruct use of said vibration probe;
   whereby said pen body can be held urging said vibration probe against a machine surface to test machine vibration level and later said pen body can be held to write data on said machine surface.

2. The machine vibration tester of claim 1 wherein said electronic display is configured to provide visible indication of each level of vibration by illumination to a predetermined configuration of different light emitting diodes.

3. The machine vibration tester of claim 2 wherein said electronic display can indicate four predetermined levels of vibration.

4. The machine vibration tester of claim 3 wherein said electronic display has a red illuminating light emitting diode to indicate the highest predetermined level of predetermined vibration.

5. The machine vibration tester of claim 4 wherein said electronic display has a green only illuminating light emitting diode to indicate the lowest predetermined level of vibration.

6. The machine vibration tester of claim 5 wherein said electronic display changing from the green only light emitting diode illumination through to the red light emitting diode illumination is indication of an increase in vibration amplitude of a nominal 6 decibel.

7. The machine vibration tester of claim 1 wherein has said electrical connection sampling an output from said electronic circuit, so that temporary electrical leads can be connected to an interfacing device, which in turn connects to a computer.

8. The machine vibration tester of claim 7 wherein in combination of predetermined formulae and means to display on said computer an output from said electronic circuit is digitally converted to engineering vibration units of amplitude for acceleration, velocity, displacement, each as a function of frequency.

* * * * *